United States Patent
Jaggers et al.

(10) Patent No.: US 6,826,638 B1
(45) Date of Patent: Nov. 30, 2004

(54) MODULAR BAY ENCLOSURE REMOVABLE CARD METHOD AND SYSTEM

(75) Inventors: Christopher M. Jaggers, Austin, TX (US); Jay M. Zill, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/353,938

(22) Filed: Jul. 15, 1999

(51) Int. Cl.$^7$ .............................................. G06F 13/00
(52) U.S. Cl. .................. 710/101; 710/301; 361/686
(58) Field of Search ......................... 361/686, 684, 361/683; 439/55; 710/101, 301

(56) References Cited

U.S. PATENT DOCUMENTS

| | | | |
|---|---|---|---|
| 5,337,220 A | * 8/1994 | Granitz ...................... 361/816 |
| 5,422,785 A | 6/1995 | Garrett et al. .............. 361/684 |
| 5,452,180 A | 9/1995 | Register et al. ............. 361/686 |
| 5,509,811 A | 4/1996 | Homic ........................ 439/55 |
| 5,572,688 A | * 11/1996 | Sytwu ........................ 710/301 |
| 5,611,057 A | 3/1997 | Pecone et al. .............. 395/282 |
| 5,634,080 A | * 5/1997 | Kikinis et al. ................ 710/73 |
| 5,680,126 A | * 10/1997 | Kikinis ........................ 341/22 |
| 5,737,582 A | * 4/1998 | Fukuzumi ................... 710/301 |
| 5,748,443 A | * 5/1998 | Flint et al. ................... 361/686 |
| 5,757,622 A | * 5/1998 | Tanaka et al. .............. 361/737 |
| 5,803,761 A | * 9/1998 | Mochizuki ................... 439/326 |
| 5,821,614 A | * 10/1998 | Hashimoto et al. ......... 257/679 |
| 5,822,547 A | * 10/1998 | Boesch et al. ............... 710/107 |
| 5,826,048 A | * 10/1998 | Dempsey et al. ........... 710/306 |
| 5,941,963 A | * 8/1999 | Charles et al. ................ 710/62 |
| 5,963,431 A | * 10/1999 | Stancil ........................ 361/803 |
| 5,973,920 A | * 10/1999 | Altic et al. ................. 165/80.2 |
| 5,987,547 A | * 11/1999 | Panasik et al. ............. 710/301 |
| 6,067,583 A | * 5/2000 | Gilbert .......................... 455/1 |
| 6,115,765 A | * 9/2000 | Lee ............................. 710/302 |
| 6,129,591 A | * 10/2000 | Czeschka ..................... 439/680 |
| 6,190,204 B1 | * 2/2001 | Huang ......................... 439/607 |
| 6,215,656 B1 | * 4/2001 | O'Neal et al. ............... 361/683 |
| 6,266,724 B1 | * 7/2001 | Harari et al. ................ 710/301 |
| 6,270,369 B1 | * 8/2001 | Kato et al. ................... 439/326 |
| 6,307,745 B1 | * 10/2001 | Liebenow .................... 361/686 |
| 6,353,870 B1 | * 3/2002 | Mills et al. .................. 710/301 |
| 6,404,626 B1 | * 6/2002 | Low et al. ................... 361/686 |
| 6,435,897 B1 | * 8/2002 | Paul et al. ................... 439/374 |
| 6,483,107 B1 | * 11/2002 | Rabinovitz et al. ......... 250/239 |
| 6,497,368 B1 | * 12/2002 | Friend et al. ........... 235/472.01 |

FOREIGN PATENT DOCUMENTS

JP         11233199 A   *  8/1999   ......... H01R/13/642

OTHER PUBLICATIONS

"Stand Alone Test Metholdology for the Small Form Factor PCI Cards", IBM Technical Disclosure Bulletin, Jan. 2000, Issue No. 429, p. 176.*

Conde, Richard et al., "Benefits and Lessons Learned from the use of the Compact PCI Standard for Spacecraft Avionics", IEEE, 2002, pp. 9.B.5–1 to 9.B.5–11.*

PCI Local Bus: Mini PCI Specification; Mar. 16, 1999; pp. 1–1–7–2.

Michael J. Homic, "*Power Management Circuit For PC Card,*" Dec. 9, 1993, Ser. No.: 08/164,513, 19 pages. (Copy Not Enclosed).

David L. Moss, "*Expansion Card Carrier And Method For A Computer System,*" Nov. 12, 1997, Ser. No.: 08/967,836, 11 pages. (Copy Not Enclosed).

* cited by examiner

*Primary Examiner*—Xuan M. Thai
(74) *Attorney, Agent, or Firm*—Baker Botts L.L.P.

(57)        ABSTRACT

A modular bay enclosure removable card method and system. The method and system include a modular bay having a removable-card connector and a removable card. In one embodiment, the removable-card connector is a mini-Peripheral Component Interconnect connector, and the removable card is a mini-Peripheral Component Interconnect card.

50 Claims, 6 Drawing Sheets

MODULAR BAY ENCLOSURE REMOVABLE CARD METHOD AND SYSTEM

BACKGROUND OF THE INVENTION

1. Field of the Invention

The present invention relates, in general, to a method and system to be utilized in data processing systems.

2. Description of the Related Art

Data processing systems are systems that manipulate, process, and store data and are notorious within the art. Personal computer systems, and their associated subsystems, constitute well known species of data processing systems.

Personal computer systems typically include a motherboard for mounting at least one microprocessor and other application specific integrated circuits (ASICs), such as memory controllers, input/output (I/O) controllers, and the like. Most motherboards include slots for additional adapter cards to provide additional function to the computer system. Typical functions that a user might add to a computer include additional microprocessors, additional memory, fax/modem capability, sound cards, graphics cards, or the like. The slots included on the motherboard generally include in-line electrical connectors having electrically conductive lands which receive exposed tabs on the adapter cards. The lands are connected to wiring layers, which in turn are connected to a bus that allows the cards to communicate with the microprocessor or other components in the system.

A personal computer system may include many different types of buses to link the various components of the system. Examples of such buses are a "local bus"0 which connects one or more microprocessors to the main memory, an Industry Standard Architecture (ISA) bus for sound cards and modems, a Universal Serial Bus (USB) for pointing devices, scanners, and digital cameras, a Fire Wire (IEEE-1394) for digital video cameras and high-speed storage drives, and a Peripheral Component Interconnect (PCI) bus for graphics cards, SCSI adapters, sound cards, and other peripheral devices such as isochronous devices, network cards, and printer devices.

As noted, a computer system may include a PCI bus. A PCI bus is a bus compliant with the PCI bus standard promulgated by the PCI special interest group (an unincorporated association of members of the microcomputer industry set up for the purpose of monitoring and enhancing the development of the Peripheral Component Interconnect (PCI) architecture). Specific PCI standards are available within PCI Spec. Rev. 2.1, available from the PCI special interest group, which is hereby incorporated by reference in its entirety.

Under the PCI bus specification, peripheral components can directly connect to a PCI bus without the need for glue logic. Thus, PCI is designed to provide a bus specification under which high-performance peripheral devices, such as graphics devices and hard disk drives, can be coupled to the CPU, thereby permitting these high-performance peripheral devices to avoid the general access latency and the bandwidth constraints that would have occurred if these peripheral devices were connected to a low speed peripheral bus.

The PCI bus standard is extremely extensive, and specifies aspects of many components related to the PCI standard. One such aspect is the physical form (e.g., physical height, width and depth) of each PCI specified component. Examples of PCI components which have specified "form factors" are PCI sockets, or slots, which are utilized to allow PCI cards (devices) to plug into, or interface with, any particular PCI bus.

Those skilled in the art will recognize that the various specified form factors for PCI cards and slots are not very amenable for implementation in smaller, more compact computers (e.g., small desktop, laptop, notebook, and sub-notebook computers). There has therefore been a move within the industry to implement the capabilities of PCI within smaller and smaller form factors. Examples of such movement are the Compact PCI and Small PCI standards, well known to those within the art.

A latest movement toward smaller form factors has been termed "mini-PCI". The mini-PCI standard is being created to allow PCI functionality to be deployed in very small volume enclosures, such as small desktop, laptop, notebook, and sub-notebook computers. The mini-PCI standard is contained within the *Mini PCI Specification*, Revision 0.8 (16 Mar. 1999) ("mini-PCI specification"), hereby incorporated by reference in its entirety.

Mini-PCI is being designed to be an internal, "under-the-covers" solution for hardware designers and OEMs. Under the Mini-PCI standard, it is envisioned that Mini-Cards are removable and upgradadable with "new technology cards," but it is envisioned that such removal and upgrade will be performed by a qualified technician. (One reason that this is true is that the Mini-PCI specification assumes that the Mini-PCI cards will be installed on a motherboard, and thus swapping out a Mini-PCI card will require that the main board be accessed and manipulated.) Consequently, Mini-PCI does not provide for the robust, encased design of a swappable, end-user solution such as standard PCI sockets and standard PCI cards.

SUMMARY OF THE INVENTION

A system and method have been invented which provide Mini-PCI with a robust, encased design of a swappable, end-user solution analogous to that available with standard PCI sockets and standard PCI cards. In one embodiment, the method and system include a modular bay having a removable-card connector. In another embodiment, the method and system further include a removable card. In yet another embodiment, the method and system include a mini-Peripheral Component Interconnect connector, and a modular bay enclosure containing the mini-Peripheral Component Interconnect connector.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the best contemplated mode for carrying out the multiple independent inventions described herein. The description is intended to be illustrative and should not be taken to be limiting. In addition, the following detailed description has been divided into sections (e.g., sections I-II) in order to highlight the invention described herein; however, those skilled in the art will appreciate that such sections are merely for illustrative focus, and that the invention herein disclosed typically draws its support from multiple sections. Consequently, it is to be understood that the division of the detailed description into separate sections is merely done as an aid to understanding and is in no way intended to be limiting.

I. Environment

Figure 1:
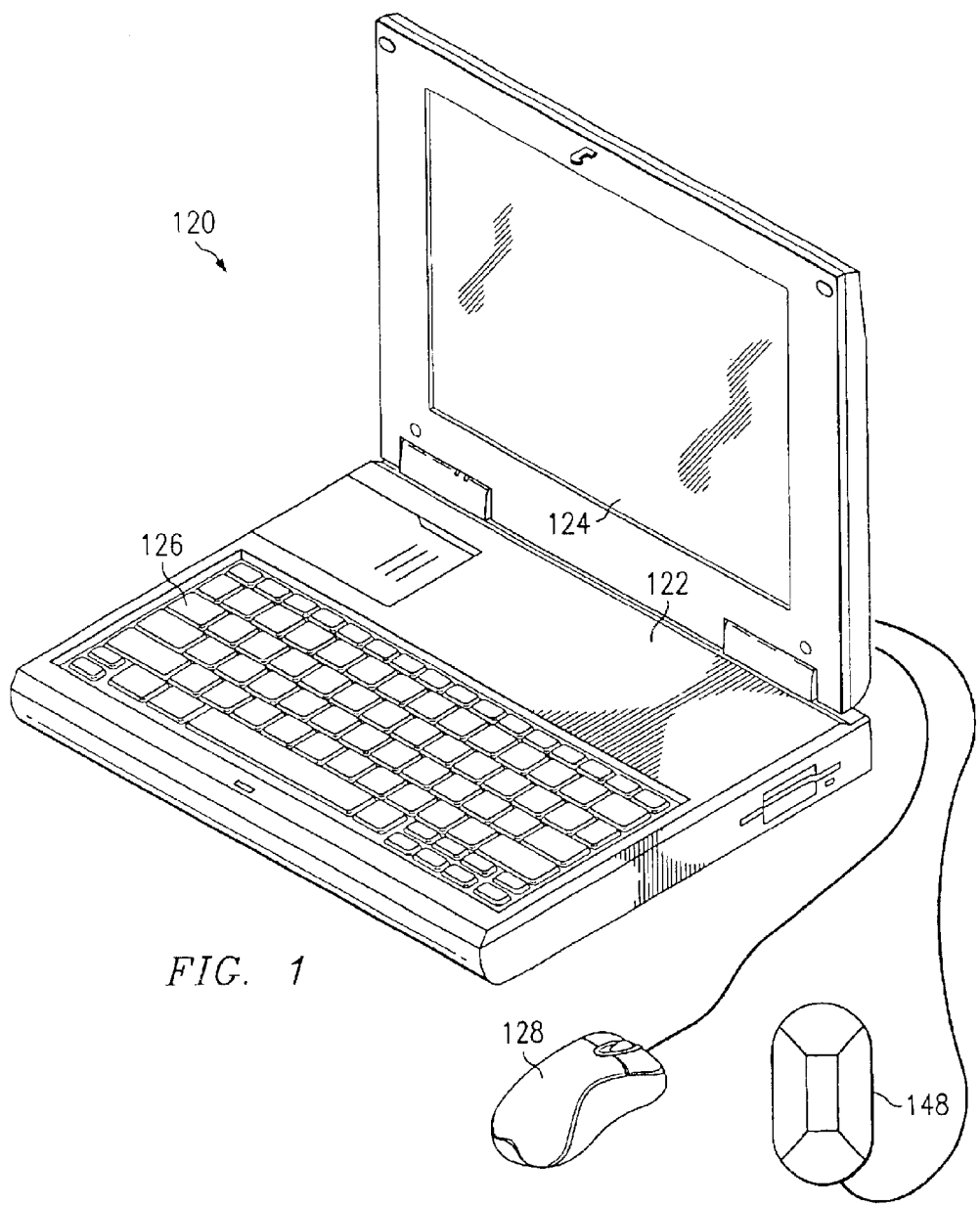
FIG. 1 depicts a pictorial representation of a data-processing system which can be utilized in accordance with the method and system of an illustrative embodiment of the present invention.

With reference now to the figures and in particular with reference now to FIG. 1, there is depicted a pictorial representation of a data-processing system which can be utilized in accordance with the method and system of an illustrative embodiment of the present invention. A graphical user interface system and method can be implemented with the data-processing system depicted in FIG. 1. A data processing system 120 is depicted which includes a system unit 122, a video display device 124, a keyboard 126, a mouse 128, and a microphone 148. Data processing system 120 may be implemented utilizing any suitable computer such as an IBM-compatible or an Apple-compatible computer.

Figure 2:
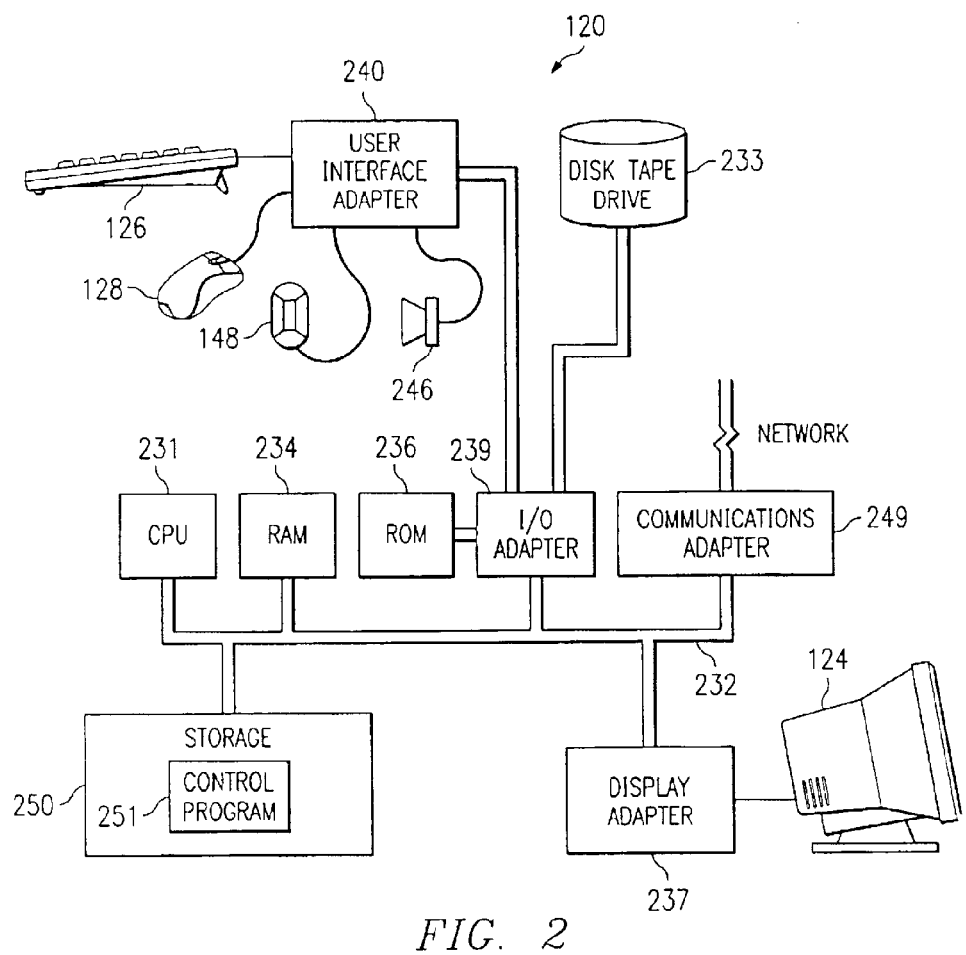
FIG. 2 illustrates a representative hardware environment, which incorporates a graphical user interface, which can be utilized in accordance with the method and system of an illustrative embodiment of the present invention.

FIG. 2 is an illustration of a representative hardware environment, which incorporates a graphical user interface. FIG. 2 depicts selected components in data processing system 120 in which an illustrative embodiment of the present invention may be implemented. Data processing system 120 includes a Central Processing Unit ("CPU") 231, such as a conventional microprocessor, and a number of other units interconnected via system bus 232. Such components and units of data processing system 120 can be implemented in a system unit such as unit 122 of FIG. 1. Data processing system 120 includes random-access memory ("RAM") 234, read-only memory ("ROM") 236, display adapter 237 for connecting system bus 232 to video display device 124, and I/O adapter 239 for connecting peripheral devices (e.g., disk and tape drives 233) to system bus 232. Video display device 124 is the visual output of data processing system 120, which can be a CRT-based video display well-known in the art of computer hardware. However, with a portable or notebook-based computer, video display device 124 can be replaced with an LCD-based or a gas plasma-based flat-panel display. Data processing system 120 further includes user interface adapter 240 for connecting keyboard 126, mouse 128, speaker 246, microphone 148, and/or other user interface devices, such as a touch screen device (not shown), to system bus 232 through I/O adapter 239. Communications adapter 249 connects data processing system 120 to a data-processing network.

Any suitable machine-readable media may retain the graphical user interface, such as RAM 234, ROM 236, a magnetic diskette, magnetic tape, or optical disk (the last three being located in disk and tape drives 233). Any suitable operating system and associated graphical user interface (e.g., Microsoft Windows) may direct CPU 231. Other technologies can also be utilized in conjunction with CPU 231, such as touch-screen technology or human voice control. In addition, data processing system 120 includes a control program 251 which resides within computer storage 250. Control program 251 contains instructions that when executed on CPU 231 carries out application program (e.g., videoconferencing software) operations.

Those skilled in the art will appreciate that the hardware depicted in FIG. 2 may vary for specific applications. For example, other peripheral devices such as optical disk media, audio adapters, or programmable devices, such as PAL or EPROM programming devices well-known in the art of computer hardware, and the like may be utilized in addition to or in place of the hardware already depicted.

Those skilled in the art will recognize that data processing system 120 can be described in relation to data processing systems which perform essentially the same functionalities, irrespective of architectures. As an example of such, an alternative partial architecture data processing system 120 is set forth in FIG. 3.

Figure 3:
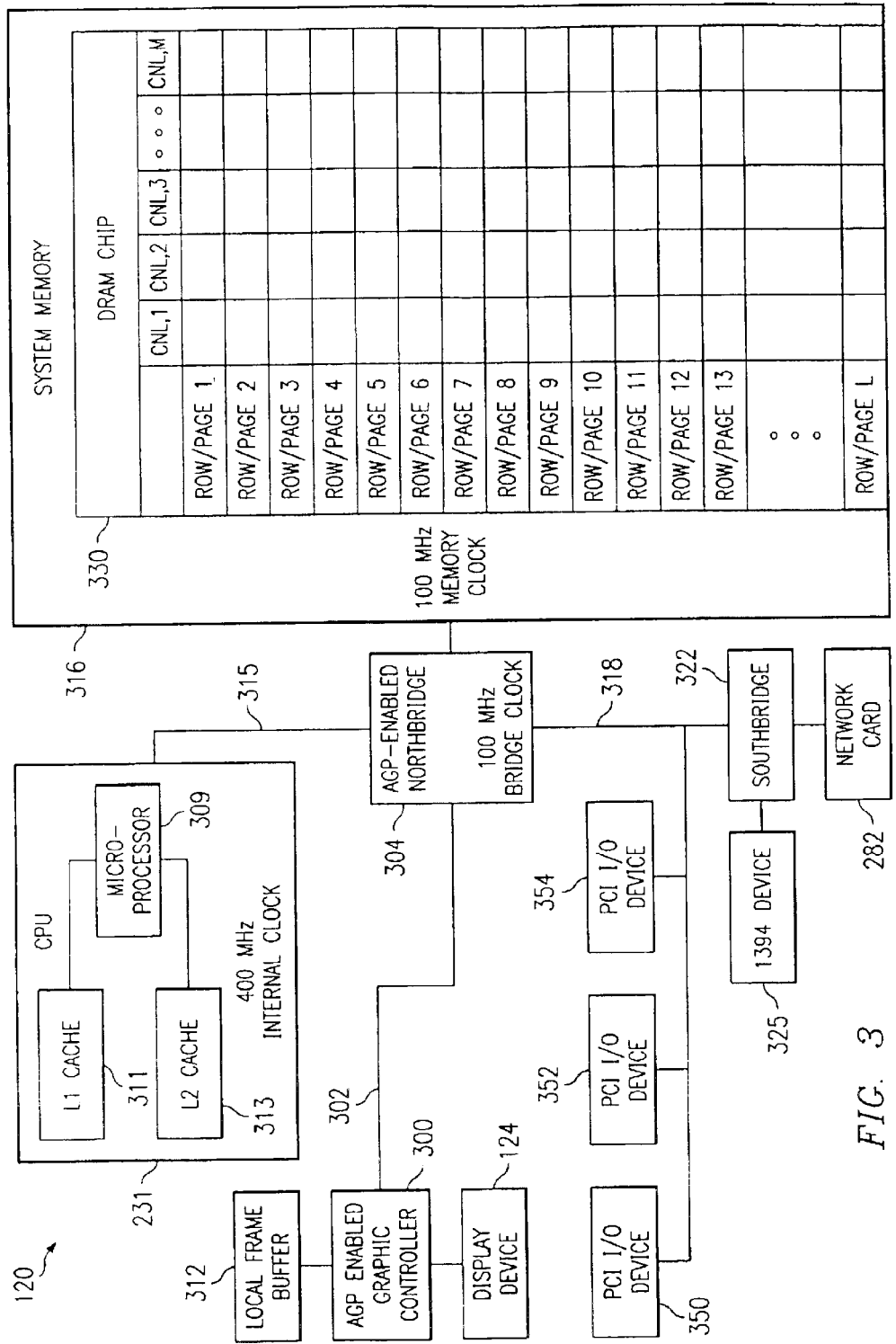
FIG. 3 shows a high-level component diagram depicting a data processing system which illustrates another environment wherein one or more embodiments of the present invention may be practiced.

Referring now to FIG. 3, shown is a high-level component diagram depicting a partial data processing system 120 which illustrates another environment wherein one or more embodiments of the present invention may be practiced. Shown are AGP-enabled graphics controller 300, AGP interconnect 302 (a data bus), and AGP-enabled Northbridge 304. Not shown, but deemed present is an AGP-enabled operating system. The term AGP-enabled is intended to mean that the so-referenced components are engineered such that they interface and function under the standards defined within the AGP interface specification (Intel Corporation, *Accelerated Graphics Port Interface Specification*, Revision 1.0 (31 Jul. 1996)). Further depicted are video display device 124, local frame buffer 312, Central Processing Unit (CPU) 231 (wherein are depicted microprocessor 309, L1 Cache 311, and L2 Cache 313), CPU bus 315, system memory 316, Peripheral Component Interconnect (PCI) bus 318, various PCI Input-Output (I/O) devices 350, 352, and 354, Southbridge 322, 1394 Device 325, and network card 327.

The foregoing components and devices are used herein as examples for sake of conceptual clarity. As for (non-exclusive) examples, CPU 231 is utilized as an exemplar of any general processing unit, including but not limited to multiprocessor units; CPU bus 315 is utilized as an exemplar of any processing bus, including but not limited to multiprocessor buses; PCI devices 350–354 attached to PCI bus 318 are utilized as an exemplar of any input-output devices attached to any I/O bus; AGP Interconnect 302 is utilized as an exemplar of any graphics bus; AGP-enabled graphics controller 300 is utilized as an exemplar of any graphics controller; Northbridge 304 and Southbridge 322 are utilized as exemplars of any type of bridge; 1394 device 325 is utilized as an exemplar of any type of isochronous source; and network card 327, even though the term "network" is used, is intended to serve as an exemplar of any type of synchronous or asynchronous input-output cards. Consequently, as used herein these specific exemplars are intended to be representative of their more general classes. Furthermore, in general, use of any specific exemplar herein is also intended to be representative of its class and the non-inclusion of such specific devices in the foregoing list should not be taken as indicating that limitation is desired.

Generally, each bus utilizes an independent set of protocols (or rules) to conduct data (e.g., the PCI local bus specification and the AGP interface specification). These protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI bus to a CPU on a CPU bus. Thus, a mechanism is developed for "translating" data that are required to be transferred from one bus architecture to another. This translation mechanism is normally contained in a hardware device in the form of a bus-to-bus bridge (or interface) through which the two different types of buses are connected. This is one of the functions of AGP-enabled Northbridge 304, Southbridge 322, and other bridges shown in that it is to be understood that such can translate and coordinate between various data buses and/or devices which communicate through the bridges.

II. Modular Bay

Figure 4:
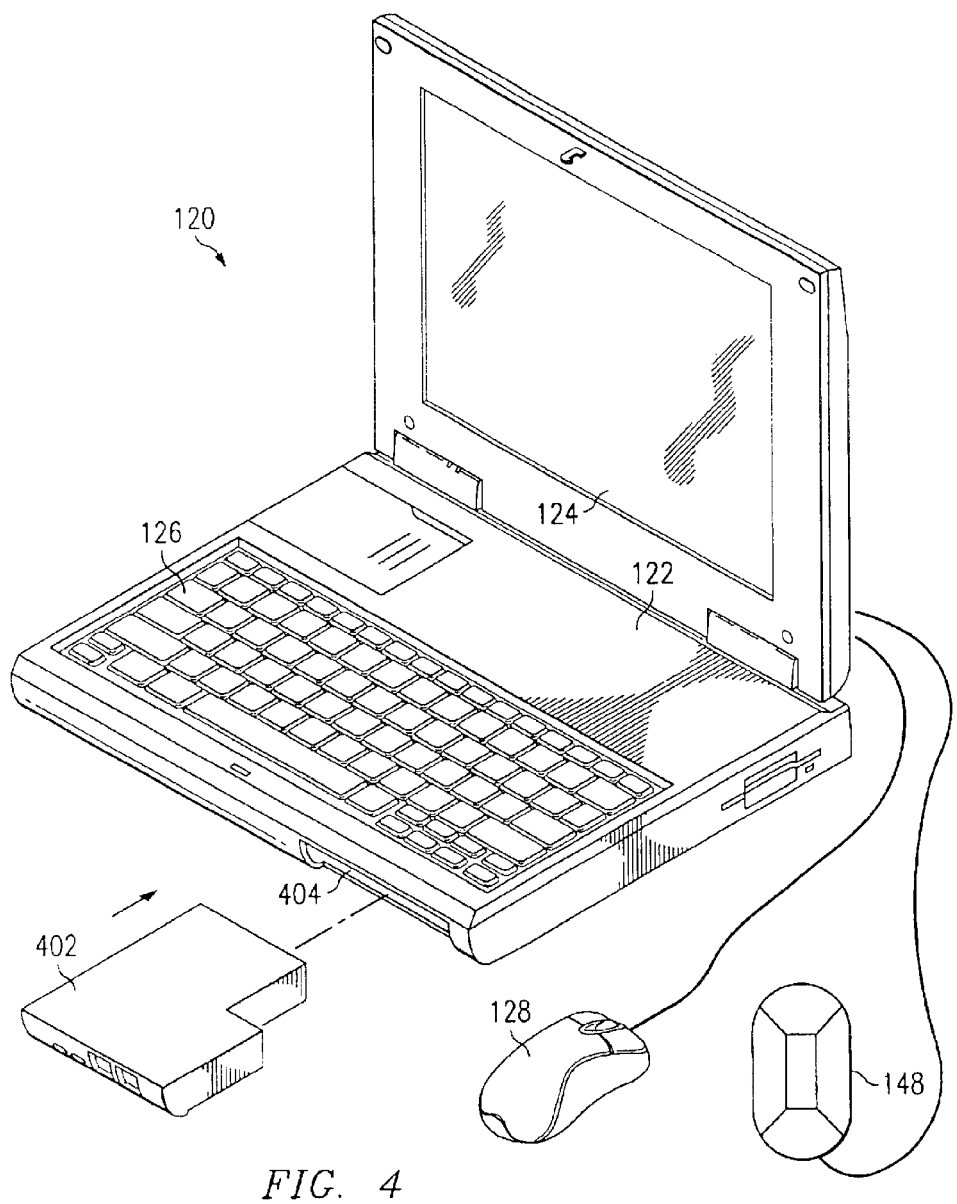
FIG. 4 illustrates data processing system 120 having module bay 402.

With reference now to FIG. 4, illustratively shown is data processing system 120 having module bay 402 (also known in the art as a media bay, or a modular bay). Depicted is that module bay 402 to be inserted into module bay receptor slot 404.

Figure 5A:
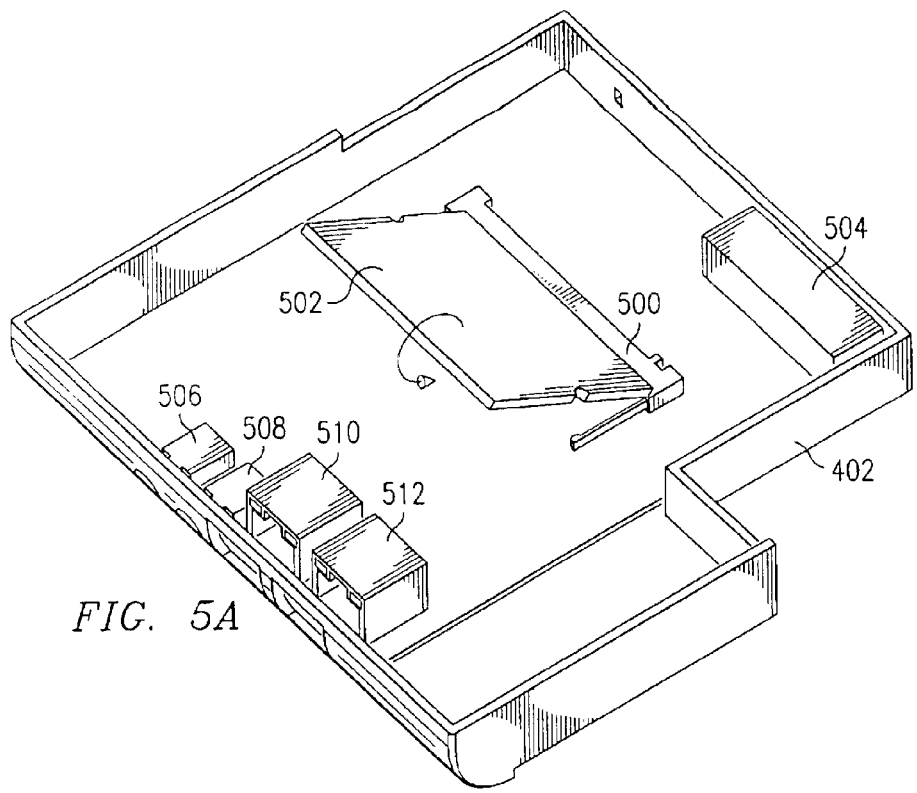
FIG. 5A depicts a cut-away perspective view of module bay 402 containing mini-PCI connector 500 and mini-PCI card 502.

Referring now to FIG. 5A, depicted is a cut-away perspective view of module bay 402. Illustrated within module bay 402 is mini-PCI connector 500. Those skilled in the art will recognize that mini-PCI connector 500 is exemplary of removable-card connectors, such as mini-PCI connectors (e.g., Type 1, 2, 3, etc.) called out in *Mini PCI Specification*, Revision 0.8 (16 Mar. 1999) ("mini-PCI specification"), hereby incorporated by reference in its entirety. Depicted is that partially inserted into mini-PCI connector 500 is mini-PCI card 502. Those skilled in the art will recognize that mini-PCI card 502 is exemplary of removable cards, such as mini-PCI cards (e.g., Type 1, 2, 3, etc.) called out in the mini-PCI specification. Illustrated is module connector 504, well known to those within the art, which can be utilized to interface with a mating connector (not shown) within data processing system 120. Those skilled in the art will recognize that module connector 504 is exemplary of many various types of connectors (e.g., male and female pin-type connectors, male and female board-edge connectors, and wireless connectors such as infrared or radio frequency connectors) used in the art of data processing. Not shown, but assumed to be present, is an electrical connection between mini-PCI connector 500 and module connector 504 sufficient to allow module connector 504 to provide the appropriate electrical and logical connections to the pins of mini-PCI connector 500 (which pins will be utilized will vary with different applications).

Further depicted are connectors which are exemplary of a few ways in which the capabilities of mini-PCI card 502 may be utilized. Illustrated are audio connector 506, video connector 508, ethernet connector 510 (e.g., an RJ45 connector), and modem connector 512 (e.g., an RJ11 connector). However, those skilled in the art will recognize that the connections shown are merely exemplary and that other connectors appropriate to the functionalities of the mini-PCI cards called out in the mini-PCI specification are also intended to be viewed as within the scope of the connectors depicted.

Figure 5B:
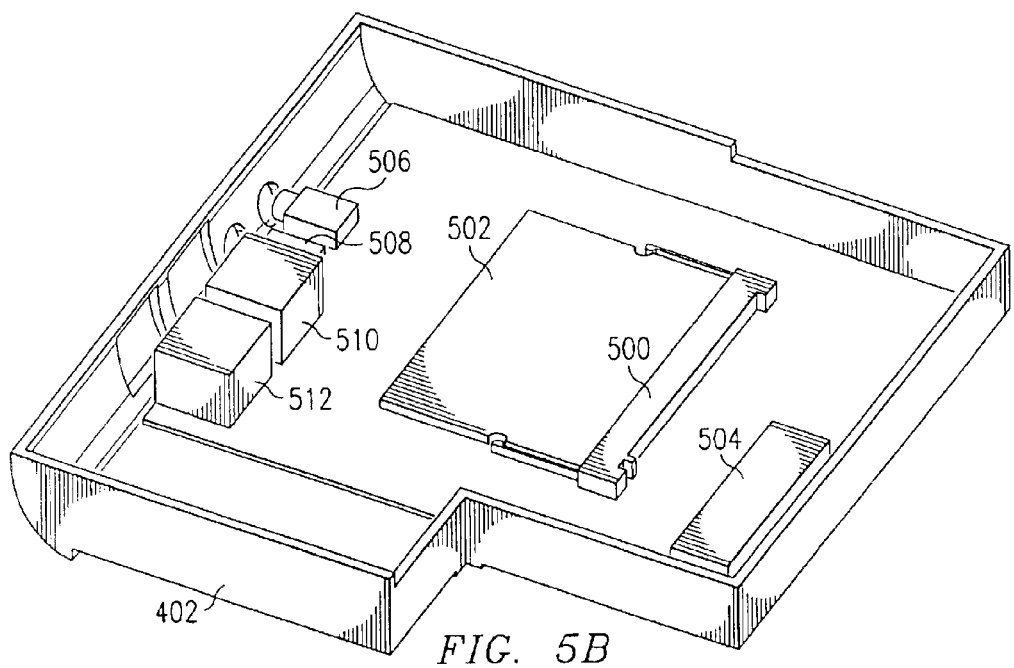
FIG. 5B shows a cut-away perspective view of module bay 402 wherein is illustrated within module bay 402 mini-PCI card 502 locked in place within mini-PCI connector 500.

Referring now to FIG. 5B, shown is a cut-away perspective view of module bay 402. Illustrated within module bay 402 is mini-PCI card 502 locked in place within mini-PCI connector 500.

Figure 6:
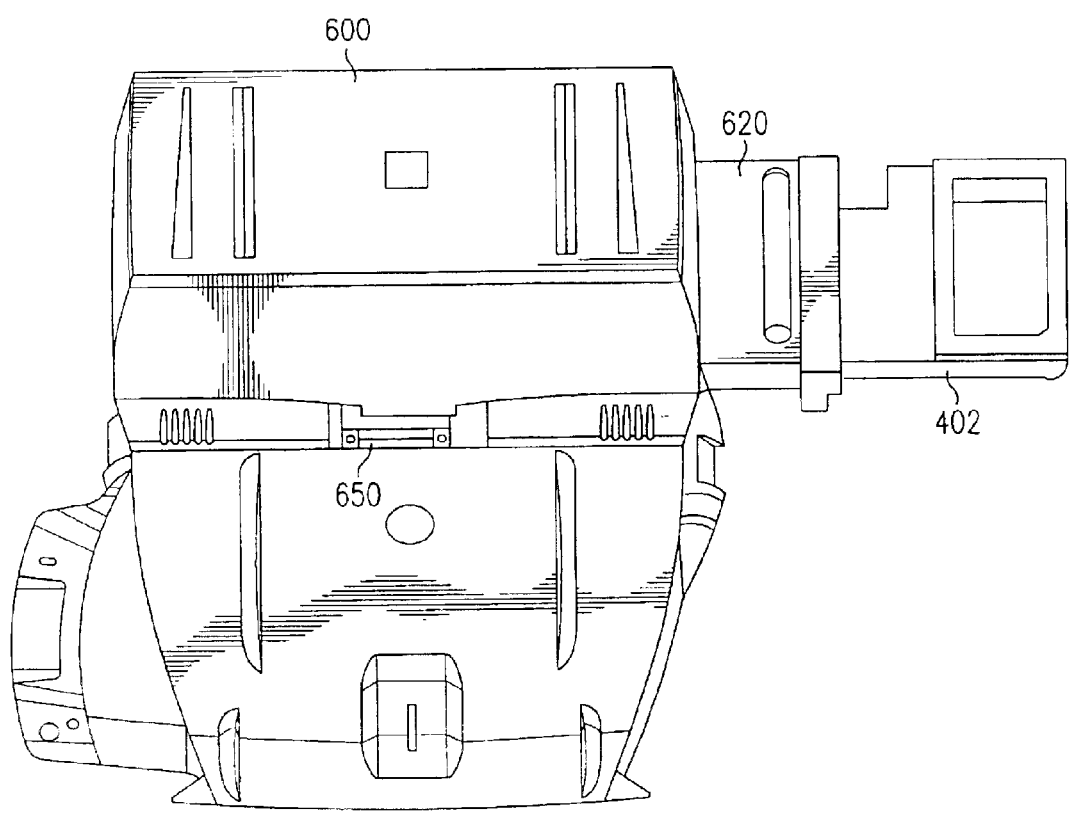
FIG. 6 shows a perspective view of module bay 402 partially inserted within module-bay-to-docking station adapter 620, where module-bay-to-docking station adapter 620 is depicted partially inserted within docking station 600.

With reference now to FIG. 6, shown is perspective view of module bay 402 partially inserted within module-bay-to-docking station adapter 620, where module-bay-to-docking station adapter 620 is depicted partially inserted within docking station 600.

The use of module bay 402 with docking station 600 can be utilized to extend the capabilities of mini-PCI card 502. It is assumed that a mating connector (not shown) exists within docking station 600 sufficient to interface with module connector 504. Those skilled in the art will recognize that module connector 504 is exemplary of many various types of connectors (e.g., male and female pin-type connectors, male and female board-edge connectors, and wireless connectors such as infrared or radio frequency connectors) used in the art of data processing. Those skilled in the art will recognize that a portable computer (not shown) would typically dock with docking station 600 via docking station connector 650.

The foregoing described embodiments depict different components contained within, or connected with, different other components. It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use of definite articles used to introduce claim elements.

What is claimed is:

1. A system comprising:
   a modular bay enclosure operable to provide an interconnect for a mini-Peripheral Component Interconnect card, which defines a functionality of the modular bay enclosure, to a computer system, wherein the modular bay enclosure only includes electrical and logical connections between the mini-Peripheral Component Interconnect card and the computer system; and a mini-Peripheral Component Interconnect connector electrically mounted to the modular bay enclosure, the mini-Peripheral Component Interconnect connector operable to allow a user to removably attach the mini-Peripheral Component Interconnect card to interconnect with the computer system.

2. The system of claim 1, further comprising:
a module connector operably connected with said mini-Peripheral Component Interconnect connector.

3. The system of claim 2, wherein said module connector operably connected with said mini-Peripheral Component Interconnect connector further comprises:
a pin-type connector.

4. The system of claim 2, wherein said module connector operably connected with said mini-Peripheral Component Interconnect connector further comprises:
a board-edge connector.

5. The system of claim 2, wherein said module connector operably connected with said mini-Peripheral Component Interconnect connector further comprises:
a wireless connector.

6. The system of claim 2, wherein said module connector operably connected with said mini-Peripheral Component Interconnect connector further includes:
said modular bay enclosure containing said module connector operably connected with said mini-Peripheral Component Interconnect connector.

7. The system of claim 1, wherein said mini-Peripheral Component Interconnect connector further includes:
the mini-Peripheral Component Interconnect connector selected from a group comprised of mini-Peripheral Component Interconnect connectors defined by a mini-Peripheral Component Interconnect specification.

8. The system of claim 7, wherein the group comprised of mini-Peripheral Component Interconnect connectors defined by the mini-Peripheral Component Interconnect specification further includes:
a type 1 mini-Peripheral Component Interconnect connector, a type 2 mini-Peripheral Component Interconnect connector, and a type 3 mini-Peripheral Component Interconnect connector.

9. The system of claim 1, wherein said modular bay enclosure containing said mini-Peripheral Component Interconnect connector further includes:
one or more connectors selected from a group comprising an audio connector, a video connector, an ethernet connector, and a modem connector.

10. The system of claim 1, further comprising:
the mini-Peripheral Component Interconnect card electrically coupled to the mini-Peripheral Component Interconnect Interface connector.

11. The system of claim 10, wherein said at least one mini-Peripheral Component Interconnect card further includes:
the mini-Peripheral Component Interconnect card selected from a group comprised of mini-Peripheral Component Interconnect cards defined by a mini-Peripheral Component Interconnect specification.

12. The system of claim 11, wherein the group comprised of mini-Peripheral Component Interconnect cards defined by the mini-Peripheral Component Interconnect specification further includes:
a type 1 mini-Peripheral Component Interconnect card, a type 2 mini-Peripheral Component Interconnect card, and a type 3 mini-Peripheral Component Interconnect card.

13. A computer system comprising:
a mini-Peripheral Component Interconnect connector operable to receive a mini-Peripheral Component Interconnect card that defines a functionality for a modular bay enclosure;

the modular bay enclosure containing said mini-Peripheral Component Interconnect connector, the modular bay enclosure operable to provide a housing for connecting the mini-Peripheral Component Interconnect card to the computer system, wherein the modular bay enclosure only includes electrical and logical connections between the mini-Peripheral Component Interconnect connector and the computer system;

an operating system;

a processing unit;

a first bridge;

a system memory; and an input-output bus.

14. The computer system of claim 13, further comprising:
a graphics bus;
a graphics controller;
a local frame buffer;
a display device;
an input-output bridge;
and a network card.

15. The computer system of claim 13, further comprising:
a hard drive;
a digital camera;
a microphone; and
videoconferencing software.

16. The system of claim 13, further comprising:
a module connector operably connected with said mini-Peripheral Component Interconnect connector.

17. The system of claim 16, wherein said module connector operably connected with said mini-Peripheral Component Interconnect connector further comprises:
a pin-type connector.

18. The system of claim 16, wherein said module connector operably connected with said mini-Peripheral Component Interconnect connector further comprises:
a board-edge connector.

19. The system of claim 16, wherein said module connector operably connected with said mini-Peripheral Component Interconnect connector further comprises:
a wireless connector.

20. The system of claim 16, wherein said module connector operably connected with said mini-Peripheral Component Interconnect connector further includes:
said modular bay enclosure containing said module connector operably connected with said mini-Peripheral Component Interconnect connector.

21. The system of claim 13, wherein said mini-Peripheral Component Interconnect connector further includes:
at least one mini-Peripheral Component Interconnect connector selected from a group comprised of mini-Peripheral Component Interconnect connectors defined by a mini-Peripheral Component Interconnect specification.

22. The system of claim 21, wherein the group comprised of mini-Peripheral Component Interconnect connectors defined by a mini-Peripheral Component Interconnect specification further includes:
a type 1 mini-Peripheral Component Interconnect connector, a type 2 mini-Peripheral Component Interconnect connector, and a type 3 mini-Peripheral Component Interconnect connector.

23. The system of claim 13, wherein said modular bay enclosure containing said mini-Peripheral Component Interconnect connector further includes: one or more connectors selected from a group comprising an audio connector, a video connector, an ethernet connector, and a modem connector.

24. The system of claim 13, wherein said at least one mini-Peripheral Component Interconnect card further includes:
at least one mini-Peripheral Component Interconnect card selected from a group comprised of mini-Peripheral Component Interconnect cards defined by a mini-Peripheral Component Interconnect specification.

25. The system of claim 24, wherein the group comprised of mini-Peripheral Component Interconnect cards defined by the mini-Peripheral Component Interconnect specification further includes:
a type 1 mini-Peripheral Component Interconnect card, a type 2 mini-Peripheral Component Interconnect card, and a type 3 mini-Peripheral Component Interconnect card.

26. A method comprising:
installing a mini-Peripheral Component Interconnect connector into a modular bay enclosure such that the modular bay enclosure operable to electrically couple the mini-Peripheral Component Interconnect connector to a computer system via an input/output bus, wherein the modular bay enclosure only includes electrical and logical connections between the mini-Peripheral Component Interconnect connector and the computer system; and
attaching a mini-Peripheral Component Interconnect card to the mini-Peripheral Component Interconnect connector to allow a user to access the mini-Peripheral Component Interconnect card via the computer system such that the mini-Peripheral Component Interconnect card defines the functionality of the modular bay enclosure.

27. The method of claim 26, further comprising:
operably connecting said mini-Peripheral Component Interconnect connector with a module connector.

28. The method of claim 27, wherein said operably connecting said mini-Peripheral Component Interconnect connector with the module connector further comprises:
operably connecting said mini-Peripheral Component Interconnect connector with a pin-type connector.

29. The method of claim 27, wherein said operably connecting said mini-Peripheral Component Interconnect connector with the module connector further comprises:
operably connecting said mini-Peripheral Component Interconnect connector with a board-edge connector.

30. The method of claim 27, wherein said operably connecting said mini-Peripheral Component Interconnect connector with the module connector further comprises:
operably connecting said mini-Peripheral Component Interconnect connector with a wireless connector.

31. The method of claim 27, wherein said operably connecting said mini-Peripheral Component Interconnect connector with the module connector further includes:
installing said module connector operably connected with said mini-Peripheral Component Interconnect connector within said modular bay enclosure.

32. The method of claim 26, wherein said installing the mini-Peripheral Component Interconnect connector into a modular bay enclosure further includes: installing into the modular bay enclosure at least one mini-Peripheral Component Interconnect connector selected from a group comprised of mini-Peripheral Component Interconnect connectors defined by a mini-Peripheral Component Interconnect specification.

33. The method of claim 32, wherein said installing into the modular bay enclosure at least one mini-Peripheral Component Interconnect connector selected from a group comprised of mini-Peripheral Component Interconnect connectors defined by a mini-Peripheral Component Interconnect specification further includes: installing into the modular bay enclosure at least one mini-Peripheral Component Interconnect connector selected from a group comprised of a type 1 mini-Peripheral Component Interconnect connector, a type 2 mini-Peripheral Component Interconnect connector, and a type 3 mini-Peripheral Component Interconnect connector.

34. The method of claim 26, wherein said installing a mini-Peripheral Component Interconnect connector into the modular bay enclosure further includes:
installing into the modular enclosure bay one or more connectors selected from a group comprising an audio connector, a video connector, an ethernet connector, and a modem connector.

35. The method of claim 26, further comprising:
operably connecting the mini-Peripheral Component Interconnect card with said mini-Peripheral Component Interconnect connector.

36. The method of claim 35, wherein said operably connecting the mini-Peripheral Component Interconnect card with said mini-Peripheral Component Interconnect connector further includes:
operably connecting said mini-Peripheral Component Interconnect card with the mini-Peripheral Component Interconnect card selected from a group comprised of mini-Peripheral Component Interconnect cards defined by a mini-Peripheral Component Interconnect specification.

37. The system of claim 36, wherein said operably connecting said mini-Peripheral Component Interconnect card with the mini-Peripheral Component Interconnect card selected from a group comprised of mini-Peripheral Component Interconnect cards defined by a mini-Peripheral Component Interconnect specification further includes:
operably connecting said mini-Peripheral Component Interconnect card the mini-Peripheral Component Interconnect card selected from a group comprised of a type 1 mini-Peripheral Component Interconnect card, a type 2 mini-Peripheral Component Interconnect card, and a type 3 mini-Peripheral Component Interconnect card.

38. A system comprising:
a modular bay having a removable-card connector, the modular bay operable to provide a housing for a removable card wherein the modular bay only includes electrical and logical connections between the removable-card connector and a computer system; and
the removable card electrically coupled to the removable-card connector such that the removable card defines a functionality of the system.

39. The system of claim 38 wherein the removable card further includes:
a mini-Peripheral Component Interconnect card selected from a group comprised of mini-Peripheral Component Interconnect cards defined by a mini-Peripheral Component Interconnect specification.

40. The system of claim 39, wherein the group comprised of mini-Peripheral Component Interconnect cards defined by the mini-Peripheral Component Interconnect specification further includes:
a type 1 mini-Peripheral Component Interconnect card, a type 2 mini-Peripheral Component Interconnect card, and a type 3 mini-Peripheral Component Interconnect card.

41. The system of claim 38, wherein the removable-card connector further includes:
a mini-Peripheral Component Interconnect connector selected from a group comprised of mini-Peripheral Component Interconnect connectors defined by a mini-Peripheral Component Interconnect specification.

42. The system of claim 41, wherein the group comprised of mini-Peripheral Component Interconnect connectors defined by the mini-Peripheral Component Interconnect specification further includes:
a type 1 mini-Peripheral Component Interconnect connector, a type 2 mini-Peripheral Component Interconnect connector, and a type 3 mini-Peripheral Component Interconnect connector.

43. The system of claim 38 further comprising: an operating system;
a processing unit;
a first bridge;
a system memory; and
an input-output bus.

44. The computer system of claim 43, further comprising:
a graphics bus;
a graphics controller;
a local frame buffer;
a display device;
an input-output bridge; and
a network card.

45. The computer system of claim 43, further comprising: a hard drive;
a digital camera;
a microphone; and
videoconferencing software.

46. A method comprising:
installing a removable-card connector in a modular bay such that the removable-card connector is electrically coupled to a computer system, wherein the modular bay only includes electrical and logical connections between the removable card and the computer system; and
installing a removable card into the modular bay, such that the removable card is electrically coupled to the removable-card connector and the removable card defines the functionality of the modular bay, wherein the modular bay provides a housing for the removable card.

47. The method of claim 46 wherein said installing the removable card into the modular bay further includes:
installing, in the modular bay, at least one mini-Peripheral Component Interconnect card selected from a group comprised of mini-Peripheral Component Interconnect cards defined by a mini-Peripheral Component Interconnect specification.

48. The method of claim 47, wherein the group comprised of mini-Peripheral Component Interconnect cards defined by a mini-Peripheral Component Interconnect specification further includes:
a type 1 mini-Peripheral Component. Interconnect card, a type 2 mini-Peripheral Component Interconnect card, and a type 3 mini-Peripheral Component Interconnect card.

49. The method of claim 46, wherein said installing a removable-card connector into a modular bay further includes:
installing, in the modular bay, at least one mini-Peripheral Component Interconnect connector selected from a group comprised of mini-Peripheral Component Interconnect connectors defined by a mini Peripheral Component Interconnect specification.

50. The method of claim 49, wherein the group comprised of mini-Peripheral Component Interconnect connectors defined by a mini-Peripheral Component Interconnect specification further includes:
a type 1 mini-Peripheral Component Interconnect connector, a type 2 mini-Peripheral Component Interconnect connector, and a type 3 mini-Peripheral Component Interconnect connector.

* * * * *